United States Patent
Yamamoto et al.

(10) Patent No.: US 10,256,049 B2
(45) Date of Patent: Apr. 9, 2019

(54) POSITIVE ELECTRODE FOR A LITHIUM ION CAPACITOR AND LITHIUM ION CAPACITOR

(71) Applicant: JM Energy Corporation, Hokuto (JP)

(72) Inventors: Norihiro Yamamoto, Hokuto (JP); Kenji Kojima, Hokuto (JP)

(73) Assignee: JM ENERGY CORPORATION, Hokuto (JP)

( * ) Notice: Subject to any disclaimer, the term of this patent is extended or adjusted under 35 U.S.C. 154(b) by 0 days.

(21) Appl. No.: 15/305,504

(22) PCT Filed: Mar. 30, 2015

(86) PCT No.: PCT/JP2015/059920
§ 371 (c)(1),
(2) Date: Oct. 20, 2016

(87) PCT Pub. No.: WO2015/163093
PCT Pub. Date: Oct. 29, 2015

(65) Prior Publication Data
US 2017/0040122 A1 Feb. 9, 2017

(30) Foreign Application Priority Data
Apr. 25, 2014 (JP) ................. 2014-091830

(51) Int. Cl.
| H01G 11/26 | (2013.01) |
| H01G 11/06 | (2013.01) |
| H01G 11/42 | (2013.01) |
| H01G 11/60 | (2013.01) |
| H01G 11/24 | (2013.01) |
| H01G 11/50 | (2013.01) |
| H01G 11/86 | (2013.01) |

(52) U.S. Cl.
CPC ............ *H01G 11/06* (2013.01); *H01G 11/24* (2013.01); *H01G 11/42* (2013.01); *H01G 11/50* (2013.01); *H01G 11/60* (2013.01); *H01G 11/86* (2013.01); *H01G 11/26* (2013.01); *Y02E 60/13* (2013.01)

(58) Field of Classification Search
CPC ........ H01G 11/06; H01G 11/86; H01G 11/50; H01G 11/24; H01G 11/60; H01G 11/42
See application file for complete search history.

(56) References Cited

U.S. PATENT DOCUMENTS

| 2009/0080142 A1 | 3/2009 | Nanba et al. |
| 2009/0135549 A1 | 5/2009 | Ando et al. |
| 2010/0142121 A1 | 6/2010 | Fujii et al. |
| 2011/0002086 A1* | 1/2011 | Feaver ............... C01B 31/00 361/502 |
| 2012/0255858 A1 | 10/2012 | Maeshima et al. |

FOREIGN PATENT DOCUMENTS

| JP | 2005-136397 A | 5/2005 |
| JP | 2007-119342 A | 5/2007 |
| JP | 2007-180431 A | 7/2007 |
| JP | 2011-100925 A | 5/2011 |
| JP | 2011-129794 A | 6/2011 |
| JP | 2011-192888 A | 9/2011 |
| JP | 2012-235041 A | 11/2012 |
| JP | 5317659 B2 | 10/2013 |

OTHER PUBLICATIONS

International Search Report dated Jun. 9, 2015 in PCT/JP2015/059920 filed Mar. 30, 2015.
European Search Report dated Jul. 13, 2018, issued in European Patent Application No. 15783925.9.
Invitation pursuant to Rule 63(1) EPC issued in corresponding European Application No. 15 783 925.9 dated Apr. 3, 2018.
Notification of Reasons for Refusal issued in corresponding Japanese Application No. 2016-514833 dated Jun. 19, 2018 (with English translation).

* cited by examiner

*Primary Examiner* — Eric W Thomas
(74) *Attorney, Agent, or Firm* — Oblon, McClelland, Maier & Neustadt, L.L.P.

(57) ABSTRACT

A positive electrode for a lithium ion capacitor includes a positive electrode layer which, after a pretreatment for measurement, has a volume of pores having pore size of not lower than 1.0 nm and lower than 1.4 nm of not lower than 0.11 cc/g, calculated by an HK method, and total pore volume calculated by a BET method of not more than 1.1 cc/g. In the pretreatment: the positive electrode is taken out of a cell of cell voltage of 3 V, cut out and immersed in 10 cc of dehydrated acetonitrile per 1 cm$^3$ of the positive electrode at 25° C. for 10 minutes with stirring. This immersion is repeated three times, and the positive electrode is in a pre-drying at 60° C. for 1 hour. The positive electrode layer is then scraped off from the positive electrode and dried for 2 hours at 200° C. and pressure reduced to 5.5 Pa.

10 Claims, No Drawings

POSITIVE ELECTRODE FOR A LITHIUM ION CAPACITOR AND LITHIUM ION CAPACITOR

TECHNICAL FIELD

The present invention relates to a positive electrode for a lithium ion capacitor and a lithium ion capacitor using said positive electrode.

BACKGROUND ART

In recent years, as an accumulator device applicable to usage that requires high energy density and high output characteristics, attention has been focused on a lithium ion capacitor.

Such a lithium ion capacitor is often used in an environment where a temperature change is considerable. Thus, a reduction in initial capacity and energy density of the lithium ion capacitor under a low-temperature environment has been a major problem.

Specifically, in a low-temperature region of around −30° C., viscosity of an electrolyte solution increases and thus mobility of electrolyte ions decreases in pores of activated carbon constituting a positive electrode active material. This causes such problems that charge and discharge capacity significantly decreases and internal resistance increases. Thus, in order to increase the mobility of electrolyte ions at low temperatures, activated carbon having a large pore volume (cc/g) has been used as a positive electrode active material. However, although the internal resistance is decreased at low temperatures by using the activated carbon having a large pore volume (cc/g), the use of such an activated carbon alone decreases density of the positive electrode, thus causing a problem that capacity per volume (F/cc) becomes low.

On the other hand, in order to achieve further improvement in performance of an electric double layer capacitor under a low-temperature environment, there is proposed a technique for improving charge and discharge characteristics and internal resistance characteristics by using activated carbon having a pore diameter determined by a BJH method within a range of 1.0 to 1.5 nm and a peak value of pore volume within a range of 0.020 to 0.035 cm$^3$/g (see, for example, Patent Literature 1).

However, the activated carbon descried in Patent Literature 1 has a BET specific surface area as small as 1500 to 2200 m$^2$/g. Thus, using such activated carbon as a positive electrode active material in the lithium ion capacitor causes a problem that the charge and discharge capacity decreases even at normal temperature.

Further, as a positive electrode active material for lithium ion capacitor, there is proposed activated carbon having the BET specific surface area of 1500 to 3000 m$^2$/g, a ratio (A) of a volume of pores having a pore diameter of not lower than 0.6 nm and lower than 1 nm to that having a pore diameter of not lower than 0.6 nm and not more than 200 nm within a range of 0.48≤A≤0.70, a ratio (B) of a volume of pores having a pore diameter of not lower than 1 nm and not more than 6 nm to that having a pore diameter of not lower than 0.6 nm and not more than 200 nm within a range of 0.20≤B≤0.52, and a total pore volume within a range of 1.21 cc (mL)/g to 1.62 cc/g (See Patent Literature 2).

However, the positive electrode active material described in the prior art document 2, which has the BET specific surface area of 1500 to 3000 m$^2$/g and the ratio (A) of the volume of pores having a pore diameter of not lower than 0.6 nm and lower than 1 nm within the range of 0.48≤A≤0.70, has an insufficient pore volume in a range of pore diameter necessary for increasing the charge and discharge capacity at around −30° C. This causes a problem that a lowering rate of the charge and discharge capacity at −30° C. with respect to that at normal temperature increases.

Further, in either of the above prior art documents, there is no description relating to pore characteristics of an electrode incorporated into the lithium ion capacitor. Thus it has been unclear as to what kinds of pore characteristics are preferable in the electrode that is constituted by the positive electrode active material as well as other auxiliary materials such as a conductive aid and a binder.

CITATION LIST

Patent Literature

Patent Literature 1: Japanese Patent Application Laid-Open No. 2007-119342

Patent Literature 2: Japanese Patent No. 5317659

SUMMARY OF INVENTION

Technical Problem

The present invention has as its object the provision of a positive electrode for a lithium ion capacitor capable of suppressing an increase in resistance at low temperatures and improving initial discharge capacity and energy density at low temperatures, thereby reducing a lowering rate of charge and discharge capacity at −30° C. with respect to that at normal temperature (25° C.), and a lithium ion capacitor using said positive electrode.

Solution to Problem

A summary constitution of the present invention is as follows.

(1) A positive electrode for a lithium ion capacitor, including a positive electrode layer (A) which, after a following pretreatment for measurement, has a volume of pores having a pore size of not lower than 1.0 nm and lower than 1.4 nm of not lower than 0.11 cc/g, the pore size being calculated by an HK method, and has a total pore volume calculated by a BET method of not more than 1.1 cc/g, Pretreatment for Measurement:

the positive electrode is taken out of a cell having a cell voltage of 3V, cut out and then immersed in 10 cc (mL) of dehydrated acetonitrile per 1 cm$^3$ of the positive electrode at 25° C. for 10 minutes with stirring; this immersion is repeated three times and the positive electrode is subjected to a pre-drying treatment at 60° C. for 1 hour; and the positive electrode layer (A) is scraped off from the positive electrode obtained by the pre-drying treatment and dried for 2 hours under conditions of 200° C. and a pressure reduced to 5.5 Pa.

(2) The positive electrode for a lithium ion capacitor according to the above-described (1), wherein the positive electrode layer (A) has a BET specific surface area calculated by the BET method of not lower than 1500 m$^2$/g and not more than 2000 m$^2$/g.

(3) The positive electrode for a lithium ion capacitor according to the above-described (1) or (2), wherein the positive electrode layer (A) has a volume of pores, having a pore size calculated by the HK method of not lower than 0.6 nm and lower than 1.0 nm, of not more than 0.23 cc/g.

(4) A lithium ion capacitor comprising the positive electrode according to any one of the above-described (1) to (3).

(5) The lithium ion capacitor according to the above-described (4), including an electrolyte solution containing a cyclic carbonate and a chain carbonate.

(6) The lithium ion capacitor according to the above-described (5), wherein the electrolyte solution contains the cyclic carbonate of 20 to 70 vol % and the chain carbonate of 30 to 80 vol % in terms of a volume ratio as a solvent.

(7) A positive electrode for a lithium ion capacitor, including a positive electrode layer (B), wherein, in the positive electrode before being incorporated into a cell, the positive electrode layer (B), after a following pretreatment for measurement, has a volume of pores having a pore size of not lower than 1.0 nm and lower than 1.4 nm of not lower than 0.13 cc/g, the pore size being calculated by the HK method, and has a total pore volume calculated by the BET method of not more than 1.2 cc/g, Pretreatment for Measurement:

the positive electrode layer (B) is scraped off and dried for 2 hours under conditions of 200° C. and a pressure reduced to 5.5 Pa.

(8) The positive electrode for a lithium ion capacitor according to the above-described (7), wherein the positive electrode layer (B) has the BET specific surface area calculated by the BET method within a range of 1900 to 2300 m$^2$/g.

(9) The positive electrode for a lithium ion capacitor according to the above-described (7) or (8), wherein the positive electrode layer (B) has a volume of pores, having a pore size of not lower than 0.6 nm and lower than 1.0 nm calculated by the HK method, of not more than 0.27 cc/g.

(10) A lithium ion capacitor including the positive electrode according to any one of the above-described (7) to (9).

(11) The lithium ion capacitor according to the above-described (10), including an electrolyte solution containing a cyclic carbonate and a chain carbonate.

(12) The lithium ion capacitor according to the above-described (11), wherein the electrolyte solution contains the cyclic carbonate of 20 to 70 vol % and the chain carbonate of 30 to 80 vol % in terms of a volume ratio as a solvent.

Advantageous Effects of Invention

According to the present invention, there is provided a lithium ion capacitor capable of suppressing an increase in resistance at low temperatures and improving initial discharge capacity and energy density at low temperatures, thereby reducing a lowering rate of charge and discharge capacity at −30° C. with respect to that at normal temperature by using a positive electrode including a positive electrode layer in which pore characteristics are adjusted within a predetermined range.

That is, according to the present invention, the positive electrode layer, under a specific condition, has a volume of pores having a pore size of not lower than 1.0 nm and lower than 1.4 nm of not lower than 0.11 cc/g, the pore size being measured by an HK method, and has a total pore volume calculated by a BET method of not more than 1.1 cc/g. As a result, a pore volume within a necessary pore diameter range is sufficiently secured and thus the charge and discharge capacity at around −30° C. increases. Furthermore, it becomes possible to suppress a reduction in the charge and discharge capacity due to an effect of mobility of electrolyte ions in the pores of the positive electrode layer, thus an increase in internal resistance can be suppressed.

Further, according to the present invention, there can be provided a positive electrode for a lithium ion capacitor in which, as mentioned above, the initial discharge capacity and energy density at low temperatures are improved and the lowering rate of the charge and discharge capacity at −30° C. with respect to that at normal temperature (25° C.) is suppressed.

DESCRIPTION OF EMBODIMENTS

As described above, the positive electrode of the present invention includes the positive electrode layer (B), which, in the positive electrode before being incorporated into a cell, has a volume of pores having a pore size of not lower than 1.0 nm and lower than 1.4 nm of not lower than 0.13 cc/g, the pore size being calculated by the HK method, and has a total pore volume calculated by the BET method of not more than 1.2 cc/g.

Further, the positive electrode of the present invention includes the positive electrode layer (A), which, in the positive electrode taken out of a cell, exhibits specific pore characteristics of having a volume of pores having a pore size of not lower than 1.0 nm and lower than 1.4 nm of not lower than 0.11 cc/g, the pore size being calculated by the HK method, and a total pore volume calculated by the BET method of not more than 1.1 cc/g. Furthermore, such a positive electrode is suitable for, for example, a capacitor formed by laminating a positive electrode layer on one or both surfaces of a current collector, in particular, a lithium ion capacitor having large capacity.

Positive Electrode:

Hereinafter, the positive electrode for a lithium ion capacitor of the present invention will be described with reference to embodiments as an example.

The positive electrode for a lithium ion capacitor according to the present invention refers to an electrode having a configuration in which a positive electrode layer is formed by applying a slurry, a mixture of a positive electrode active material, a binder and the like, onto a positive electrode current collector.

Positive Electrode Active Material:

The positive electrode active material constituting the positive electrode layer in the positive electrode of the present invention is, for example, a material capable of reversibly carrying lithium ions and at least one kind of anions such as tetrafluoroborate.

As specific examples of the preferred positive electrode active material constituting the positive electrode layer, may be mentioned activated carbon and a heat-treated product of an aromatic condensed polymer such as a polyacene-based material (hereinafter also referred to as PAS).

The positive electrode active material constituting the positive electrode layer has a 50% volume cumulative size D50 of preferably 1 to 12 μm, particularly preferably 2 to 8 μm. When the 50% volume cumulative size D50 is too small, there is concern that applying such an active material to a lithium ion capacitor decreases a capacity retention rate of the lithium ion capacitor. It is inferred that this is because the porosity between particles of the positive electrode active material decreases as the electrode density of the positive electrode layer in the positive electrode increases excessively, and as a result, an electrolyte solution is likely to be depleted. On the other hand, when the 50% volume cumulative size D50 is too large, the electrode density required for forming the positive electrode layer cannot be obtained, thus making it difficult to form the positive electrode. Further, even if the positive electrode can be formed, there is concern that a lithium ion capacitor to which such an active material is applied may have the low energy density.

The 50% volume cumulative size D50 of the positive electrode active material described herein is measured, for example, by a laser diffraction micro-track method and an X-ray micro-track method.

In the positive electrode of the present invention, as the positive electrode active material constituting the positive electrode layer, the positive electrode active material having the BET specific surface area of more than 2200 m$^2$/g and not more than 2800 m$^2$/g is preferably used in order to adjust the BET specific surface area of the positive electrode layer within a desired range.

When the BET specific surface area of the positive electrode active material becomes less than 2200 m$^2$/g, the BET specific surface area of the positive electrode layer, either before or after being incorporated into a cell, becomes too small, making it difficult to sufficiently secure the pore volume in a range of pore diameter necessary for increasing the charge and discharge capacity. As a result, the initial capacity and the energy density at normal temperature and −30° C. tend to decrease, which is not preferred.

Further, when the BET specific surface area is more than 2800 m$^2$/g, the BET specific surface area of the positive electrode layer, either before or after being incorporated into a cell, becomes too large, making it difficult to suppress the total pore volume of the positive electrode to not more than a predetermined value. As a result, the density of the positive electrode decreases and the energy density under environments of normal temperature and −30° C. tends to decrease, which is not preferred.

The positive electrode active material constituting the positive electrode layer has the BET specific surface area of preferably more than 2200 m$^2$/g and not more than 2800 m$^2$/g, more preferably 2300 to 2700 m$^2$/g, further preferably 2300 to 2600 m$^2$/g.

If the BET specific surface area of the positive electrode active material is too small, the BET specific surface area of the positive electrode layer obtained therefrom becomes small. Accordingly, when such an active material is applied to a lithium ion capacitor, the capacity of the lithium ion capacitor decreases and the internal resistance tends to increase. On the other hand, if the BET specific surface area of the positive electrode active material is too large, bulk density of the positive electrode active material and the positive electrode layer obtained therefrom becomes very large. Accordingly, when such an active material is applied to a lithium ion capacitor, the energy density per cell volume decreases. Furthermore, an amount of the electrolyte solution required in a cell becomes more than usual. Thus there is concern that the energy density per cell mass also decreases. It is noted that producing the positive electrode active material having the BET specific surface area of more than 2800 m$^2$/g is difficult and therefore not realistic.

Specifically, activated carbon is preferably used as the positive electrode active material constituting the positive electrode layer in the positive electrode of the present invention.

That is, as the positive electrode active material constituting the positive electrode layer of the present invention, the positive electrode active material made of the activated carbon having the BET specific surface area of more than 2200 m$^2$/g and not more than 2800 m$^2$/g is preferably used.

The positive electrode active material has a volume of pores having a pore size of not lower than 1.0 nm and lower than 1.4 nm of preferably not lower than 0.16 cc/g and lower than 0.23 cc/g, particularly preferably not lower than 0.17 cc/g and lower than 0.22 cc/g. Further, the volume of pores having a pore size of not lower than 0.6 nm and lower than 1.0 nm is preferably not lower than 0.18 cc/g and not more than 0.32 cc/g, particularly preferably not lower than 0.20 cc/g and not more than 0.30 cc/g.

When the positive electrode active material has the pore volume in the each pore size range within the above-described range, applying such an active material to a lithium ion capacitor improves the initial discharge capacity and the energy density and thus can reduce a lowering rate of the charge and discharge capacity at −30° C. with respect to that at normal temperature.

That is, as the positive electrode active material constituting the positive electrode layer of the present invention, it is preferable to use the activated carbon having a volume of pores having a pore size of not lower than 1.0 nm and lower than 1.4 nm of not lower than 0.16 cc/g and lower than 0.23 cc/g.

Further, the positive electrode active material constituting the positive electrode layer can be obtained, for example, by subjecting a raw material of the positive electrode active material to a carbonizing treatment by firing, an activation treatment, and then a pulverization treatment.

As a raw material of the positive electrode active material, for example, a phenolic resin, petroleum pitch, petroleum coke, a coconut husk, coal-based coke and the like are used. Of these, the phenolic resin or the coal-based coke is preferable for the reason that the specific surface area can be made large.

Further, as the above-mentioned activation treatment, an alkali-activation treatment or a steam-activation treatment is preferable. As an alkali activating agent used for this alkali-activation treatment, a salt or a hydroxide of alkali metal such as lithium, sodium and potassium is preferably used and potassium hydroxide is particularly preferable.

Further, the above-mentioned pulverization treatment is performed by pulverizing the raw material to 10 to 200 μm using a well-known pulverizer such as, for example, a ball mill.

In the present invention, the pore volumes of the positive electrode active material, having a pore size of not lower than 0.6 nm and lower than 1.0 nm and a pore size of not lower than 1.0 nm and lower than 1.4 nm, are obtained as follows.

First, a powder of the positive electrode active material as an object to be measured is subjected to a heat treatment and then to a dry treatment under a depressurized condition for a predetermined time to prepare a measurement sample. An adsorption isotherm of this measurement sample is obtained using a specific surface area measurement apparatus and then the pore volumes are calculated from this adsorption isotherm by an HK method analysis. The HK method analysis is a calculation method commonly used for a micro-pore analysis of a porous material such as activated carbon. The HK method assumes that pores formed in the activated carbon and the like have, for example, a slit shape and calculates a pore size distribution from an average potential of the pores. The HK method was developed by Horvath and Kawazoe (Geza Horvath and Kunitaro Kawazoe, J. Chem. Eng. Japan, 16, 470 (1983)).

Further, the positive electrode active material has the total pore volume calculated by the BET method of preferably not lower than 1.0 cc/g and not more than 1.5 cc/g, particularly preferably not lower than 1.1 cc/g and not more than 1.45 cc/g.

When the total pore volume of the positive electrode active material is too large, the positive electrode obtained therefrom has low electrode density in the positive electrode layer. Thus there is concern that the energy density under environments of normal temperature and −30° C. decreases.

In the present invention, the total pore volume can be obtained by performing linear interpolation on adsorption data obtained by the BET method and determining an adsorption amount at a relative pressure of 0.99.

Positive Electrode Before Incorporation into Cell:

In the positive electrode of the present invention, before being incorporated into a cell, it is necessary that the positive electrode layer (B) has a volume of pores having a pore size of not lower than 1.0 and lower than 1.4 nm of not lower than 0.13 cc/g, the pore size being calculated by the HK method, and has a total pore volume calculated by the BET method of not more than 1.2 cc/g. In the positive electrode of the present invention, before being incorporated into a cell, the positive electrode layer (B) has the BET specific surface area of preferably not lower than 1900 $m^2/g$ and not more than 2300 $m^2/g$, further preferably 1950 to 2250 $m^2/g$, particularly preferably 2000 to 2200 $m^2/g$.

If the BET specific surface area of the positive electrode layer (B) is too small, applying such a positive electrode layer to a lithium ion capacitor decreases the capacity of the lithium ion capacitor and increases the internal resistance. On the other hand, if the BET specific surface area of the positive electrode layer (B) is too large, the electrode density decreases. As a result, when such a positive electrode layer is applied to a lithium ion capacitor, the energy density of the lithium ion capacitor decreases. Further, electrode strength decreases due to insufficient binding of the positive electrode layer (B) by a binder, thereby causing difficulty in manufacturing the lithium ion capacitor.

As for the positive electrode layer (B) in the positive electrode of the present invention, before being incorporated into a cell, each measurement is carried out after performing a following pretreatment for measurement. The positive electrode layer (B) is scraped off from the produced positive electrode and dried for 2 hours under conditions of 200° C. and a pressure reduced to 5.5 Pa to prepare a measurement sample. Then, the BET specific surface area of the measurement sample is measured with a specific surface area measurement apparatus. The measurement value thus obtained represents the BET specific surface area of the positive electrode layer (B). Further, the pore volume of the measurement sample is obtained by a similar method as for calculating the pore volume of the positive electrode active material using the HK method analysis. This resulting value represents the pore volume of the positive electrode layer (B).

The positive electrode layer (B) in the positive electrode before being incorporated into a cell has a volume of pores having a pore size of not lower than 1.0 nm and lower than 1.4 nm of preferably not lower than 0.13 cc/g and not more than 0.20 cc/g, further preferably not lower than 0.14 cc/g and not more than 0.19 cc/g. Further, the positive electrode layer (B) has a volume of pores having a pore size of not lower than 0.6 nm and lower than 1.0 nm of preferably not more than 0.27 cc/g, more preferably not lower than 0.13 cc/g and not more than 0.27 cc/g, particularly preferably not lower than 0.15 cc/g and not more than 0.25 cc/g.

When the positive electrode layer (B) in the positive electrode before being incorporated into a cell has the pore volume in the each pore size range within the above-described range, applying such an positive electrode layer to a lithium ion capacitor improves the initial discharge capacity and the energy density and thus can reduce a lowering rate of the charge and discharge capacity at −30° C. with respect to that at normal temperature.

Further, the positive electrode layer (B) in the positive electrode before being incorporated into a cell has a total pore volume of necessarily not more than 1.2 cc/g, preferably not lower than 0.9 cc/g.

When the total pore volume of the positive electrode layer (B) in the positive electrode before being incorporated into a cell is too large, the electrode density of the positive electrode layer decreases and there is concern that the energy density under environments of normal temperature and −30° C. decreases. Further, when the total pore volume of the positive electrode layer (B) in the positive electrode before being incorporated into a cell is too small, the pore volume necessary for generating capacity decreases and there is concern that the initial discharge capacity at normal temperature and low temperatures becomes insufficient.

In the present invention, a measuring method of the total pore volume can be obtained by a similar method used for calculating the total pore volume of the positive electrode active material using the BET method.

The positive electrode layer (B) in the positive electrode of the present invention, before being incorporated into a cell, may have a density of 0.38 to 0.7 $g/cm^3$, preferably has a density of 0.4 to 0.65 $g/cm^3$, further preferably 0.41 to 0.6 $g/cm^3$.

If the electrode density of the positive electrode layer is too small, applying such an positive electrode layer to a lithium ion capacitor decreases the energy density of the lithium ion capacitor. On the other hand, if the electrode density of the positive electrode layer is too large, the porosity of the positive electrode layer decreases. As a result, when such a positive electrode layer is applied to a lithium ion capacitor, an electrolyte solution is unlikely to permeate through the inside of the positive electrode layer. For this reason, it becomes difficult for lithium ions to be transferred and accordingly it becomes difficult for electrons to be transferred. As a result, there is concern that the internal resistance of the lithium ion capacitor increases and the capacity decreases.

The electrode density of the positive electrode layer in the positive electrode of the present invention is a value obtained by dividing a mass of the positive electrode layer by an external volume of said positive electrode layer, the mass and the external volume of the positive electrode layer being measured in a dry condition.

The "external volume of the positive electrode layer" described herein refers to a volume calculated on the basis of measured values, which are obtained by measuring length, width and thickness dimensions of the positive electrode layer.

Positive Electrode Taken Out of Cell:

As for the positive electrode layer (A) in the positive electrode of the present invention, being taken out of a cell, each measurement is performed after the following treatment.

The positive electrode is taken out of a cell having a cell voltage of 3V, cut out and then immersed in 10 cc (mL) of dehydrated acetonitrile per 1 $cm^3$ of the positive electrode at 25° C. for 10 minutes with stirring. This immersion operation is repeated three times and then the positive electrode is subjected to a pre-drying treatment at 60° C. for 1 hour. The positive electrode layer (A) is scraped off from the positive electrode obtained by the pre-drying treatment and dried for 2 hours under conditions of 200° C. and a pressure reduced to 5.5 Pa to prepare a measurement sample. The measurement sample is then measured for the BET specific surface area using a specific surface area measurement apparatus. The measured value thus obtained represents the BET specific surface area of the positive electrode layer (A). Further, a pore volume of the measurement sample is determined by a similar method used for calculating the pore volume of the positive electrode active material using the HK method analysis. This resulting value represents the pore volume of the positive electrode layer (A).

In the positive electrode layer (A) in the positive electrode of the present invention being taken out of the cell, no particular limitation is imposed on a process for adjusting a cell voltage at 3 V before the positive electrode is taken out of the cell. For example, if the cell voltage exceeds 3 V, constant current-constant voltage discharging, in which discharging is performed at a constant current until the cell voltage drops to 3 V and then a constant voltage of 3 V is applied, may be performed. Further, if the cell voltage is lower than 3 V, constant current-constant voltage charging, in which charging is performed at a constant current until the cell voltage reaches 3 V and then a constant voltage of 3 V is applied, may be performed.

Then, the positive electrode of the present invention taken out of the cell is required to have following specific pore characteristics: a volume of pores having a pore size of not lower than 1.0 nm and lower than 1.4 nm is not lower than 0.11 cc/g and not more than 0.18 cc/g, the pore size being calculated by the HK method; and a total pore volume calculated by the BET method is not lower than 0.6 cc/g and not more than 1.1 cc/g. Further, the positive electrode layer (A) in the positive electrode of the present invention, being taken out of the cell and subjected to the pretreatment for measurement, has the BET specific surface area of preferably not lower than 1500 $m^2/g$ and not more than 2000 $m^2/g$, further preferably 1550 to 1950 $m^2/g$.

If the BET specific surface area of the positive electrode layer (A) is too small, applying such an positive electrode layer to a lithium ion capacitor decreases the capacity of the lithium ion capacitor and increases the internal resistance. On the other hand, if the BET specific surface area of the positive electrode layer (A) is too large, the electrode density decreases. As a result, when such a positive electrode layer is applied to a lithium ion capacitor, the energy density of the lithium ion capacitor decreases.

The positive electrode layer (A) in the positive electrode taken out of the cell has a volume of pores having a pore size of not lower than 1.0 nm and lower than 1.4 nm of necessarily not lower than 0.11 cc/g, preferably not lower than 0.11 cc/g and not more than 0.18 cc/g, further preferably not lower than 0.12 cc/g. Further the positive electrode layer (A) has a volume of pores having a pore size of not lower than 0.6 nm and lower than 1.0 nm of preferably not more than 0.23 cc/g, more preferably not lower than 0.1 cc/g and not more than 0.23 cc/g, particularly preferably not lower than 0.12 cc/g and not more than 0.21 cc/g.

When the positive electrode layer (A) in the positive electrode taken out of the cell has the pore volume in the each pore size range within the above-described range, applying such an positive electrode layer to a lithium ion capacitor improves the initial discharge capacity and the energy density and thus can reduce a lowering rate of the charge and discharge capacity at −30° C. with respect to that at normal temperature.

The positive electrode layer (A) in the positive electrode taken out of the cell has a total pore volume of necessarily not more than 1.1 cc/g, preferably not lower than 0.6 cc/g and not more than 1.1 cc/g, further preferably not lower than 0.8 and not more than 1.1 cc/g. If the total pore volume of the positive electrode layer (A) in the positive electrode taken out of the cell is too large, the electrode density of the positive electrode layer decreases and thus there is concern that the energy density under environments of normal temperature and −30° C. decreases. On the other hand, the total pore volume of the positive electrode layer (A) in the positive electrode taken out of the cell is too small, the pore volume necessary for generating the capacity decreases and thus there is concern that the initial discharge capacity at normal temperature and low temperatures becomes insufficient.

A measuring method of the total pore volume can be obtained by a similar method used for calculating the total pore volume of the positive electrode active material using the BET method.

The positive electrode of the present invention having the positive electrode layer with the specific pore characteristics can be produced by appropriately selecting the type and use amount of the positive electrode active material used in the positive electrode layer, the type and use amount of the binder, the type and use amount of the conductive material and the type and use amount of the an optional thickener used if needed, and the like. For example, the positive electrode of the present invention having the specific pore characteristics of the positive electrode layer cannot be obtained only by appropriately selecting the positive electrode active material and the conductive material if the type and use amount of the binder are not appropriate.

In the present invention, it is satisfactory if the above conditions are met by either of the following characteristics: the characteristics of the positive electrode layer (B) in the positive electrode before being incorporated into the cell; and the characteristics of the positive electrode layer (A) in the positive electrode taken out of the cell.

The positive electrode layer (A) in the positive electrode of the present invention, being taken out of the cell, has density of sufficiently 0.37 to 0.69 $g/cm^3$, preferably 0.39 to 0.64 $g/cm^3$, further preferably 0.4 to 0.59 $g/cm^3$. If the electrode density of the positive electrode layer is too small, applying such a positive electrode layer to a lithium ion capacitor decreases the energy density of the lithium ion capacitor. On the other hand, if the electrode density of the positive electrode layer is too large, the porosity of the positive electrode layer decreases. As a result, when such a positive electrode layer is applied to a lithium ion capacitor, an electrolyte solution is unlikely to permeate through the inside of the positive electrode layer. For this reason, it becomes difficult for lithium ions to be transferred and accordingly it becomes difficult for electrons to be transferred. As a result, there is concern that the internal resistance of the lithium ion capacitor increases and a capacity retention rate thereof decreases.

Binder:

As a binder constituting the positive electrode layer of the present invention, polymer materials having oxidation resistance and solubility resistance to an electrolyte solution can preferably be used. As examples of the binder, may be mentioned a rubber-based binder such as styrene-butadiene rubber (SBR), a fluorine-containing resin such as polytetrafluoroethylene and polyvinylidene fluoride, a hydrocarbon resin such as polypropylene and polyethylene and an acrylic polymer. As the binder constituting the positive electrode layer of the present invention, the binder made of an acrylic polymer is preferable and the binder made of a water-soluble acrylic copolymer is particularly preferable.

In the following production process of the positive electrode, suppose a case where the positive electrode layer is formed by only using the positive electrode active material and a polymer material having no oxidation resistance, for example, carboxymethyl cellulose, as a thickener without using the binder made of the above-mentioned polymer material. In this case, when the obtained positive electrode is applied to a lithium ion capacitor, the thickener swells by absorbing an aprotic organic solvent constituting an electrolyte solution in the cell of the lithium ion capacitor. As a result, binding strength of the positive electrode layer to a current collector becomes insufficient and the positive electrode layer is easily peeled off from the current collector.

Further, as long as the positive electrode of the present invention includes the positive electrode layer in which the positive electrode active material is bonded together by the binder, the positive electrode may be formed by laminating the positive electrode layer in which the positive electrode active material is bonded together by the binder and a conductive layer made of, for example, carbon and the like that does not contain the positive electrode active material. The thickness of the conductive layer in the positive electrode is preferably 5 to 20% of the total thickness of the positive electrode layer and the conductive layer. Specifically, the thickness of the conductive layer is normally preferably 1 to 20 μm.

Further, the thickness of the positive electrode layer in the positive electrode of the present invention is preferably 30 to 350 μm, further preferably 50 to 200 μm.

Current Collector:

As the current collector in the positive electrode of the present invention, various materials commonly used for lithium batteries may be used, so long as they have through-holes penetrating from a front surface to a back surface as exemplified by an electrolytically etched foil, an etched foil and expanded metal.

As specific examples of the materials, may be mentioned aluminum and stainless steel.

The shape and the number of the through-holes formed in the current collector are not particularly limited and may be designed in a manner such that lithium ions can move between front and back surfaces of the electrode without being blocked by the current collector.

Further, the thickness of the current collector in the positive electrode of the present invention is not particularly limited, but normally 1 to 50 μm, preferably 5 to 40 μm, particularly preferably 10 to 40 μm.

Production Process of Positive Electrode:

As examples of the process of producing the positive electrode of the present invention, may be mentioned the following production processes.

(1) A process of producing the positive electrode in which a positive electrode active material, a binder and an additive such as a conductive agent and a thickener used as necessary are dispersed in an aqueous medium to prepare a slurry and then the obtained slurry is applied onto the current collector having a conductive layer and the like optionally in advance as necessary, followed by drying.

(2) A process of producing the positive electrode in which a slurry prepared as in the above-described (1) is first formed into a sheet shape, and then the slurry is subjected to a press treatment to densify the positive electrode layer and adhered to the current collector preferably using a conductive adhesive.

In the processes of producing the positive electrode of the present invention, it is preferable that the slurry is prepared by adding the binder to a dispersion containing the positive electrode active material. Specifically, it is preferable that a positive electrode active material dispersion containing the positive electrode active material and a binder dispersion containing the binder are separately prepared, and then the binder dispersion is added to the positive electrode active material dispersion.

In the present invention, the positive electrode active material dispersion may contain a material other than the binder (specifically, an additive such as a conductive agent and a thickener, which is used) in addition to the positive electrode active material.

By adding the binder to the dispersion containing the positive electrode active material in this manner, it becomes possible to obtain the positive electrode layer having a desired pore volume and BET specific surface area as well as desired electrode density.

Thickener:

When the thickener is included in the positive electrode active material dispersion, the thickener may be added to the dispersion containing the positive electrode active material (but not containing a thickener), or the positive electrode active material may be added to a dispersion containing the thickener. However, it is preferable that the thickener is added to the dispersion containing the positive electrode active material (but not containing a thickener). By adding the thickener to the dispersion containing the positive electrode active material, it becomes possible to sufficiently suppress infiltration of the binder and the optional additive such as the thickener into the surface pores of the positive electrode active material. As a result, a lithium ion capacitor produced in this manner can further increase the capacity and decrease the internal resistance.

Further, when the positive electrode active material is added to a dispersion containing the thickener, it is preferable that the dispersion containing the positive electrode active material is prepared separately from the dispersion containing the thickener, and then the dispersion containing the positive electrode active material is added to the dispersion containing the thickener.

The use amount of the binder varies depending on electrical conductivity of the positive electrode active material, a shape of the positive electrode layer to be formed and the like, however, it is preferably 1 to 15 mass %, further preferably 3 to 10 mass %, per 100 mass % of the positive electrode active material.

Conductive Agent:

As examples of the conductive agent optionally used for forming the positive electrode, may be mentioned acetylene black, Ketjenblack, furnace black, channel black, lamp black, graphite and metal powders. Of these, acetylene black or Ketjenblack is preferable.

The use amount of the conductive agent varies depending on electrical conductivity of the positive electrode active material, a shape of the positive electrode layer to be formed and the like, however, it is preferably 1 to 40 mass %, further preferably 2 to 20 mass %, per 100 mass % of the positive electrode active material.

As examples of the thickener optionally used for forming the positive electrode, may be mentioned carboxymethyl cellulose (CMC), polyethylene oxide (PEO) and polyvinyl alcohol (PVA). As the thickener, carboxymethyl cellulose is preferable.

The use amount of the thickener is preferably 1 to 10 mass %, further preferably 1 to 5 mass %, per 100 mass % of the entire slurry.

According to the positive electrode of the present invention described above, the positive electrode layer has a specific pore volume. Thus, a lithium ion capacitor using such a positive electrode layer can achieve high energy density and high capacity.

Lithium Ion Capacitor:

The lithium ion capacitor of the present invention includes the positive electrode of the present invention as a positive electrode.

A preferable configuration of the lithium ion capacitor of the present invention is described as follows.

A lithium ion capacitor cell includes the positive electrode and the negative electrode, and the electrolyte solution containing an electrolyte through which lithium ions can be transferred, thereby involving the movement of lithium ions. The positive electrode includes a current collector having through-holes penetrating from a front surface to a back surface and includes a positive electrode active material that can reversibly carry lithium ions and/or anions. Further, the negative electrode includes a current collector having through-holes penetrating from a front surface to a back surface and includes a negative electrode active material that can reversibly carry lithium ions. The negative electrode is electrochemically doped with lithium.

In the present description, the "negative electrode" is an electrode into which an electric current flows during discharging, while the "positive electrode" is an electrode from which an electric current flows during discharging, as described above.

A doping amount of lithium ions in this capacitor cell is preferably set to a level not to cause such a problem in consideration of a type and the like of the active materials constituting the negative electrode and the positive electrode.

Further, the term "doping" means occlusion, adsorption or insertion, and in a broad sense, refers to a phenomenon in which at least one of lithium ions and anions enter the positive electrode active material or a phenomenon in which lithium ions enter the negative electrode active material. Further, the term "dedoping" also means deocclusion and release and refers to a phenomenon in which lithium ions or anions are deoccluded from the positive electrode active material or a phenomenon in which lithium ions are deoccluded from the negative electrode active material.

Further, in the capacitor cell constituting the lithium ion capacitor of the present invention, it is preferable that specifically electrostatic capacity per unit mass of the negative electrode active material is more than three times larger than electrostatic capacity per unit mass of the positive electrode active material and a mass of the positive electrode active material used in the positive electrode is larger than a mass of the negative electrode active material used in the negative electrode by 1.1 to 10 times.

The capacitor cell having such a configuration can achieve high voltage and high capacity. Further, according to the capacitor cell in which the electrostatic capacity per unit mass of the negative electrode active material is much larger than the electrostatic capacity per unit mass of the positive electrode active material, high voltage can be achieved and, in the same time, the mass of the negative electrode active material can be reduced without changing an amount of potential of the negative electrode through structural design. Accordingly, it becomes possible to increase a filling amount of the positive electrode active material, thus the capacitor cell can increase the electrostatic capacity and the capacity.

In this configuration, if the mass of the positive electrode active material is less than 1.1 times the mass of the negative electrode active material, the mass of the negative electrode active material becomes unnecessarily excessive and the energy density decreases. Further, if the mass of positive electrode active material is larger than 10 times the mass of the negative electrode active material, discharge capacity of the negative electrode increases, so that there is concern that the negative electrode becomes overdischarged at the time of discharge and metal is dissolved from the negative electrode current collector. Furthermore, a difference in thickness between the positive electrode and the negative electrode becomes excessively large, and this is not preferable in terms of the structure of the capacitor cell.

It is noted that the electrostatic capacity and the capacity are defined as follows in the present invention.

The electrostatic capacity of the capacitor cell is represented by a quantity of electricity flowing through the cell per unit voltage of said capacity cell (slope of discharge curve) (unit: F).

Further, the electrostatic capacity per unit mass of the capacitor cell is represented by a value obtained by dividing the electrostatic capacity of the capacitor cell by the total mass of the positive electrode active material and the negative electrode active material (unit: F/g).

Further, the electrostatic capacity of the positive electrode or the negative electrode is represented by a quantity of electricity flowing through the capacity cell per unit voltage of the positive electrode or the negative electrode (integrated value of discharge curve, unit: F).

Further, the electrostatic capacity per unit mass of the positive electrode or the negative electrode is represented by a value obtained by dividing the electrostatic capacity of the positive electrode or the negative electrode by the mass of the positive or negative electrode active material (unit: F/g).

Further, the capacity of the capacitor cell is obtained by multiplying a difference between a discharge start voltage and a discharge end voltage of the capacitor cell, i.e., a voltage change quantity, by the electrostatic capacity of the capacitor cell (unit: C).

It is noted that 1.0 C is a quantity of charge transferred in 1 second by a current of 1.0 A, thus the unit for capacity is converted to mAh in the present specification.

Further, the capacity of the positive electrode is obtained by multiplying a difference in the potential of the positive electrode between a start time point and an end time point of discharge (potential change quantity of positive electrode) by the electrostatic capacity of the positive electrode (unit: C or mAh). Similarly, the capacity of the negative electrode is obtained by multiplying a difference in the potential of the negative electrode between a start time point and an end time point of discharge (potential change quantity of negative electrode) by the electrostatic capacity of the negative electrode (unit: C or mAh).

The capacity of the capacitor cell coincides with the capacity of the positive electrode and the capacity of the negative electrode.

Negative Electrode:

The negative electrode constituting the lithium ion capacitor of the present invention, for example, has a structure in which a negative electrode active material layer having the negative electrode active material bonded together by the binder is laminated on one surface or both surfaces of the current collector.

Negative Electrode Active Material Layer:

In the lithium ion capacitor of the present invention, the negative electrode active material is a material capable of reversibly carrying lithium ions.

As specific examples of the preferable negative electrode active material, may be mentioned a carbonaceous material such as graphite and hardly graphitizable carbon (hard carbon) or a heat-treated product of an aromatic condensed polymer such as a polyacene-based material (PAS).

As the binder constituting the negative electrode active material layer in the negative electrode, the same binder constituting the positive electrode layer in the positive electrode described above can be mentioned.

Further, the thickness of the negative electrode active material layer in the negative electrode is preferably 20 to 250 μm.

Current Collector:

As the current collector, like the current collector constituting the positive electrode described above, various materials commonly used for lithium batteries may be used, so long as they have through-holes penetrating from a front surface to a back surface as exemplified by expanded metal.

As specific examples of the materials, may be mentioned stainless steel, copper and nickel.

The shape and the number of the through-holes formed in the current collector are not particularly limited and may be designed in a manner such that lithium ions can move between front and back surfaces of the electrode without being blocked by the current collector.

Further, the thickness of the current collector in the negative electrode is not particularly limited, but normally 1 to 50 μm, preferably 5 to 40 μm, particularly preferably 10 to 40 μm.

Production Process of Negative Electrode:

The negative electrode constituting the lithium ion capacitor of the present invention is produced from the current collector, the negative electrode active material, the binder and a conductive agent used as necessary. Specific examples of the production process include followings.

(1) A process in which the negative electrode active material, the binder and an additive such as a conductive agent and a thickener used as necessary are dispersed in an aqueous medium to prepare a slurry and then the obtained slurry is applied onto the current collector and dried.

(2) A process in which a slurry prepared as in the above-mentioned (1) is first formed into a sheet shape, and the slurry is then adhered to the current collector preferably using a conductive adhesive.

The use amount of the binder for forming the negative electrode can be set in the same range as the use amount of the binder for forming the positive electrode as described above.

As the conductive agent used for forming the negative electrode as necessary, the same conductive agent used for forming the positive electrode as necessary described above can be mentioned, and also the use amount thereof can be set in the same range.

As the thickener used for forming the negative electrode as necessary, the same thickener used for forming the positive electrode as necessary described above can be mentioned, and also the use amount thereof can be set in the same range.

Doping with Lithium Ions:

In the lithium ion capacitor of the present invention, a method for doping the negative electrode with lithium ions is not particularly limited. As examples of such a method, may be mentioned the one in which a supply source of lithium ions capable of supplying lithium ions, such as lithium metal, is arranged in the capacitor cell as a lithium electrode. The lithium electrode may be arranged in a state of being physically in contact with the negative electrode (short-circuited) or arranged at a position that allows electrochemical doping.

The current collectors constituting the positive electrode and the negative electrode include the through-holes. Thus, even when lithium ions are electrochemically doped in a capacitor cell constructed as a wound-type cell or a laminated-type cell, the entire negative electrodes can be electrochemically doped with lithium ions smoothly and uniformly, so long as the lithium electrode is arranged so as to be opposed to part of the capacitor cell at the outermost periphery or on the outermost side, specifically, for example, in a location opposed to one of the positive electrodes or the negative electrodes.

As the lithium electrode, for example, the one in which a supply source of lithium ions is formed on a current collector made of a conductive porous material can be used. As the conductive porous material constituting the current collector in the lithium electrode, a porous metallic material made of copper, stainless steel and the like, which does not react with the supply source of lithium ions, can be used. Examples of such a porous metallic material include stainless steel mesh.

Further, when lithium ions are electrochemically doped from the supply source of lithium ions, a material used as the supply source of lithium ions, such as lithium metal and lithium-aluminum alloy, contains at least lithium and thus can supply lithium ions.

The amount of the supply source of lithium ions (mass of lithium metal, etc.) may be in such a range that the negative electrode can achieve predetermined capacity.

Electrolyte Solution:

As the electrolyte solution in the lithium ion capacitor of the present invention, an aprotic organic solvent electrolyte solution (solution prepared by dissolving an electrolyte containing lithium salts in an aprotic organic solvent) is used.

As examples of the aprotic organic solvent constituting the electrolyte solution of the present invention, may be mentioned cyclic carbonates such as ethylene carbonate and propylene carbonate, chain carbonates such as dimethyl carbonate, diethyl carbonate and methylethyl carbonate, γ-butyrolactone, acetonitrile, dimethoxyethane, tetrahydrofuran, dioxolane, methylene chloride and sulfolane.

These may be used either singly or in any combination thereof.

The electrolyte solution of the present invention preferably contains the cyclic carbonate and the chain carbonate. In particular, the electrolyte solution further preferably contains the cyclic carbonate of 20 to 50 vol % and the chain carbonate of 50 to 80 vol % at a volume ratio.

When the cyclic carbonate and the chain carbonate are within the above-mentioned ranges, the Stokes diameter of solvated lithium ions becomes small enough for the ions to penetrate into the pores of the positive electrode. Thus, the resistance tends to decrease and the charge and discharge capacity tends to increase at low temperatures. When the volume ratios are out of the above-mentioned ranges, the Stokes diameter of solvated lithium ions becomes too large for the ions to easily penetrate into the pores of the positive electrode and the viscosity of the electrolyte solution increases at low temperatures. Because of reasons such as above, there is concern that the resistance increases.

As the electrolyte constituting the electrolyte solution of the present invention, various electrolytes can be used so long as being able to produce lithium ions.

As specific examples of the above-mentioned electrolyte, may be mentioned $LiClO_4$, $LiAsF_6$, $LiBF_4$, $LiPF_6$, $LiN(C_2F_5SO_2)_2$ and $LiN(CF_3SO_2)_2$. As the above-mentioned electrolyte, $LiPF_6$ and $LiN(CF_3SO_2)_2$ are preferable.

It is preferable that the concentration of the electrolyte in the aprotic organic solvent electrolyte solution as the electrolyte solution is at least 0.1 mol/L or more for the reason that low internal resistance can be achieved.

The aprotic organic solvent electrolyte solution constituting the electrolyte solution described herein is obtained by mixing the electrolyte in a fully dehydrated state and the aprotic organic solvent.

Structure of Lithium Ion Capacitor:

As examples of a structure of the lithium ion capacitor according to the present invention may be mentioned, specifically, the one suitable for a capacitor cell with large capacity, such as a wound-type cell in which a strip-shaped positive electrode and a strip-shaped negative electrode are laminated through a separator and wounded, a laminated-type cell in which a plate-shaped positive electrode and a plate-shaped negative electrode are laminated through a separator, each electrode being laminated in total of three or more layers, and a film-type cell in which a plate-shaped positive electrode and a plate-shaped negative electrode are laminated through a separator, each electrode being laminated in total of three or more layers, followed by being enclosed with an outer packaging film.

These capacitor cell structures are known from WO00/07255, WO03/003395, Japanese Patent Application Laid-Open No. 2004-266091 and the like, and the capacitor cell of the present invention can be formed in the same structures as the known cells described above.

The lithium ion capacitor of the present invention uses the positive electrode of the present invention, and thus high energy density and high capacity can be achieved.

The lithium ion capacitor of the present invention having such a configuration is very effective as a driving power source or an auxiliary power source for electric vehicles, hybrid electric vehicles and the like. Further, it can be suitably used as a driving power source for electric bicycles, electric wheelchairs and the like, an energy accumulator device for solar energy generators, wind power generators and the like or an accumulator source for home electric appliances.

EXAMPLES

The present invention will be described below by way of specific examples. However, the present invention should not be limited to the following examples.

Measurement Methods of Pore Volume and Specific Surface Area:

First, 0.02 g of powders to be measured were collected and put in a test tube, and the weight of the test tube containing the powders was measured. Then, the powders were dried for 2 hours under conditions of a temperature of 200° C. and a pressure reduced to 5.5 Pa. Subsequently, the weight of the test tube containing the dried powders was measured and the actual weight of the powders used for the measurement was calculated by a following formula.

Actual weight of powders=0.02−(weight of test tube before drying−weight of test tube after drying)

An adsorption/desorption isotherm of these powders was measured with nitrogen as an adsorbate using a specific surface area measuring apparatus "BELSORP-miniII" (manufactured by BELL Japan, Inc.), and then the pore volumes of the powders having a pore size of not lower than 0.6 nm and lower than 1.0 nm and a pore size of not lower than 1.0 nm and lower than 1.4 nm were obtained by the HK method. Further the specific surface area by the BET method and the total pore volume of the powders were obtained.

Preparation of Negative Electrode Slurry 1:

A thermosetting phenolic resin molded plate having a thickness of 0.5 mm was put in an electric furnace and subjected to a heat treatment by raising a temperature to 1100° C. at a temperature Increase rate of 10° C./hour in a nitrogen atmosphere and maintaining the temperature at 1100° C. for 2 hours to synthesize hard carbon. The thus obtained hard carbon was crushed to the average particle size of 3 μm by a disk mill to obtain hard carbon powders.

Next, to 92 parts by mass of the obtained hard carbon powders, 6 parts by mass of acetylene black powders, 5 parts by mass of a water-soluble acrylate copolymer binder, 4 parts by mass of carboxymethyl cellulose and 200 parts by mass of ion exchange water were added and the mixture was thoroughly mixed with a mixing and stirring device to obtain a negative electrode slurry 1.

Preparation of Positive Electrode Slurry 1:

As a positive electrode active material, 92 parts by mass of activated carbon powders, having the BET specific surface area of 2400 $m^2/g$, the volume of pores having a pore size of not lower than 1.0 nm and lower than 1.4 nm of 0.19 cc/g, the volume of pores having a pore size of not lower than 0.6 nm and lower than 1.0 nm of 0.29 cc/g, the pore size being determined by the HK method analysis, the total pore volume of 1.29 cc/g and the average particle size (average particle size D50) of 4 μm, were added to 6 parts by mass of acetylene black powders as a conductive agent and 120 parts by mass of ion exchange water and the mixture was mixed with a biaxial planetary stirrer to obtain a dispersion liquid having the positive electrode active material and the conductive agent dispersed therein.

Next, to the obtained dispersion liquid, 4 parts by mass of carboxymethyl cellulose dissolved in 36 parts by mass of ion exchange water was added as a thickener and the mixture was mixed with a biaxial planetary stirrer. Subsequently, 44 parts by mass of ion exchange water and 6 parts by mass of a water-soluble acrylate copolymer binder were added and the resulting mixture was mixed with a biaxial planetary stirrer to obtain a positive electrode slurry 1.

Preparation of Positive Electrode Slurry 2:

A positive electrode slurry 2 was obtained in the same manner as described in the preparation of the positive electrode slurry 1 except that activated carbon powders having the BET specific surface area of 2350 $m^2/g$, the volume of pores having a pore size of not lower than 1.0 nm and lower than 1.4 nm of 0.17 cc/g, the volume of pores having a pore size of not lower than 0.6 nm and lower than 1.0 nm of 0.25 cc/g, the pore size being determined by the HK method analysis, the total pore volume of 1.19 cc/g and the average particle size (average particle size D50) of 4 μm was used as a positive electrode active material.

Preparation of Positive Electrode Slurry 3:

A positive electrode slurry 3 was obtained in the same manner as described in the preparation of the positive electrode slurry 1 except that activated carbon powders having the BET specific surface area of 2510 $m^2/g$, the volume of pores having a pore size of not lower than 1.0 nm and lower than 1.4 nm of 0.21 cc/g, the volume of pores having a pore size of not lower than 0.6 nm and lower than 1.0 nm of 0.30 cc/g, the pore size being determined by the HK method analysis, the total pore volume of 1.42 cc/g and the average particle size (average particle size D50) of 4 μm was used as a positive electrode active material.

Preparation of Positive Electrode Slurry 4 (Comparative Positive Electrode Slurry):

A positive electrode slurry 4 was obtained in the same manner as described in the preparation of the positive electrode slurry 1 except that activated carbon powders having the BET specific surface area of 1930 m$^2$/g, the pore volume of the powders having a pore size of not lower than 1.0 nm and lower than 1.4 nm of 0.13 cc/g, the pore volume of the powders having a pore size of not lower than 0.6 nm and lower than 1.0 nm of 0.21 cc/g, the pore size being determined by the HK method analysis, the total pore volume of 1.17 cc/g and the average particle size (average particle size D50) of 4 μm was used as a positive electrode active material.

Preparation of Positive Electrode Slurry 5 (Comparative Positive Electrode Slurry):

A positive electrode slurry 5 was obtained in the same manner as described in the preparation of the positive electrode slurry 1 except that activated carbon powders having the BET specific surface area of 3000 m$^2$/g, the volume of pores having a pore size of not lower than 1.0 nm and lower than 1.4 nm of 0.22 cc/g, the volume of pores having a pore size of not lower than 0.6 nm and lower than 1.0 nm of 0.38 cc/g, the pore size being determined by the HK method analysis, the total pore volume of 1.84 cc/g and the average particle size (average particle size D50) of 4 μm was used as a positive electrode active material.

Preparation of Positive Electrode Slurry 6 (Comparative Positive Electrode Slurry):

A positive electrode slurry 6 was obtained in the same manner as described in the preparation of the positive electrode slurry 1 except that an SBR-based copolymer binder was used instead of the water-soluble acrylate copolymer binder.

Production of Negative Electrode Test Sample 1:

As a current collector, copper expanded metal (manufactured by Nippon Metal Industry Co., Ltd.) having a thickness of 35 μm and a porosity of 50% was prepared. A negative electrode active material layer was formed on the current collector by applying the negative electrode slurry 1 onto both sides of this copper expanded metal using a roll coater, thereby producing a sheet-shaped negative electrode test sample 1.

By using the obtained negative electrode test sample 1, a lithium ion capacitor was produced according to the following production example of lithium ion capacitor.

Production of Positive Electrode Test Samples 1 to 6:

As a current collector, aluminum expanded metal (manufactured by Nippon Metal Industry Co., Ltd.) having a thickness of 35 μm and a porosity of 50% was prepared. A conductive layer having a thickness of 5 μm was formed on the current collector by coating a non-aqueous carbon-based conductive coating "EB-815" (manufactured by Acheson (Japan) Ltd.) onto both sides of this aluminum expanded metal in a spray method, followed by a dry treatment. In the current collector having the conductive layer formed thereon, through-holes of the aluminum expanded metal were substantially blocked by the conductive layer.

Subsequently, a layer made of the positive electrode slurry (positive electrode slurry layer) was formed on the conductive layer formed on the current corrector by applying each of the positive electrode slurry 1 to positive electrode slurry 6 onto both sides of the current collector having the conductive layer formed thereon using a roll coater, thereby producing sheet-shaped positive electrode test samples 1 to 6, each of which includes a positive electrode layer formed as a laminate of the conductive layer and the positive electrode slurry layer on the current collector.

By using the obtained positive electrode test samples 1 to 6, lithium ion capacitors were produced according to the following production example of lithium ion capacitor. Further, the positive electrode layers were measured for the pore volume, the BET specific surface area and the electrode density by the following methods. The results are shown in Table 1-1.

Measurement Methods of Pore Volume and Specific Surface Area of Positive Electrode Layer in Positive Electrode:

The above-mentioned positive electrode test samples 1 to 6 were each cut into a size of 5 cm$^3$, and then the positive electrode layer was scraped off from each of the samples and dried for 2 hours under conditions of 200° C. and a pressure reduced to 5.5 Pa to obtain a powdery mixture of constituent components (specifically, the positive electrode active material, the binder, the conductive agent and the thickener as constituent components of the positive electrode slurry layer, and the conductive layer) of the positive electrode layer.

Subsequently, the obtained powdery mixture was measured by the above-described methods for the volume of pores having a pore size of not lower than 1.0 and lower than 1.4 nm, the volume of pores having a pore size of not lower than 0.6 nm and lower than 1.0 nm, the BET specific surface area and the total pore volume.

Measurement of Electrode Density of Positive Electrode Layer in Positive Electrode:

The positive electrode test samples 1 to 6 were each cut into a size in length and width dimensions of 40 mm×60 mm to obtain an electrode density measuring sample. The mass and the external volume of the electrode density measuring sample were measured and, on the basis of these measurement values, the mass of the positive electrode layer and the external volume of said positive electrode layer were calculated. On the basis of the mass value of the positive electrode layer and the external volume value of the positive electrode layer thus obtained, the electrode density was calculated by dividing the mass value by the external volume value.

Production of Lithium Ion Capacitor for Measuring Electrostatic Capacity:

Production of Negative Electrode Test Sample for Measuring Negative Electrode Electrostatic Capacity:

A copper foil having a thickness of 18 μm was prepared as a current collector. The negative electrode slurry 1 was applied onto one side of the copper foil under an applying condition of 7 mg/cm$^2$ (based on solid content) and the applied material was subjected to a dry treatment and a press treatment to produce a negative electrode test sample for measuring negative electrode electrostatic capacity.

Measurement of Electrostatic Capacity Per Unit Mass of Negative Electrode:

The negative electrode test sample for measuring the negative electrode electrostatic capacity was cut into a size of 1.5 cm×2.0 cm (area of 3.0 cm$^2$) to obtain an electrostatic capacity measuring sample and used as a negative electrode for measuring the electrostatic capacity. As a counter electrode of this negative electrode, lithium metal having a size in length and width dimensions of 1.5 cm×2.0 cm (area of 3.0 cm$^2$) and a thickness of 200 μm was prepared. Further, as a separator, a nonwoven fabric made of polyethylene having a thickness of 50 μm was prepared. A simulated cell was produced with the following configuration: counter electrodes were arranged on both sides of the positive electrode through the separates; a lithium metal plate was provided as a reference electrode; and a propylene carbonate solution obtained by dissolving $LiPF_6$ at a concentration of 1 mol/L was used as an electrolytic solution.

Next, the obtained simulated cell was charged at a charging current of 1 mA so that the negative electrode active material was supplied with lithium ions corresponding to 400 mAh/g based on the mass of the negative electrode active material. Then, the simulated cell was charged under a condition of a charging current of 1 mA until a cell voltage (voltage of capacitor) reached 1.5 V. Subsequently, the electrostatic capacity per unit mass of the negative electrode was obtained on the basis of a discharge time until the cell voltage (voltage of capacitor) changed by 0.2 V from a potential of the negative electrode one minute after the start of the discharge. As a result, the electrostatic capacity was found to be 661 F/g.

Example 1: Production Example of Lithium Ion Capacitor 1

<<Production of Electrode Laminate>>

By cutting the negative electrode test sample 1, eleven negative electrodes each including an electrode body having a size of 6.0 cm×7.5 cm (area of 45 $cm^2$) and a terminal connection portion continuing to said electrode body were produced. Further, by cutting the positive electrode test sample 1, ten positive electrodes each including an electrode body having a size of 5.8 cm×7.3 cm (area of 42.34 $cm^2$) and a terminal connection portion continuing to said electrode body were produced.

Next, the ten positive electrodes and the eleven negative electrodes were alternately laminated through a separator made of a cellulose/rayon mixed nonwoven fabric having a thickness of 35 μm and the four sides of the laminate were sealed with a tape. In this configuration, the laminate was formed in a manner such that the terminal connection portions in the positive electrodes and the terminal connection portions in the negative electrodes were arranged opposite to each other and the positive electrode layers in the positive electrodes and the negative electrode layers in the negative electrodes were each faced to each other to form 20 pairs. Further, two separators were disposed in a space between the bottom negative electrode and a positive electrode inside thereof (hereinafter referred to as a "space between the positive and negative electrodes inside the bottom") and a space between the top negative electrode and a positive electrode inside thereof (hereinafter referred to as a "space between the positive and negative electrodes inside the top"). Other than the spaces between the positive and negative electrodes inside the top and the bottom, one separator was disposed in each space between the positive electrode and the negative electrode. Then, terminal welding portions in the ten positive electrodes constituting the obtained laminate were each ultrasonically welded to an aluminum positive electrode terminal having a size in length and width dimensions of 50 mm×50 mm and a thickness of 0.2 mm. Further, terminal welding portions in the eleven negative electrodes were each ultrasonically welded to a copper negative electrode terminal having a size in length and width dimensions of 50 mm×50 mm and a thickness of 0.2 mm. An electrode laminate was produced in this manner.

In the electrode laminate thus obtained, the mass of the positive electrode active material was 1.4 times larger than the mass of the negative electrode active material.

<<Production of Lithium Ion Capacitor>>

Two lithium electrodes were prepared by compression-bonding a lithium metal foil (corresponding to 200 mAh/g) having a size in length and width dimensions of 6.0 cm×7.5 cm (area of 45 $cm^2$) and a thickness of 80 μm to a lithium electrode current collector made of a copper mesh having a thickness of 80 μm. Each of the two lithium electrodes is disposed on the top part and the bottom part of the electrode laminate so as to be perfectly opposed to the negative electrode located on the outermost side of the laminate through the two separators. Then, a terminal welding portion of the lithium electrode current collector in each lithium electrode was joined to the copper negative electrode terminal by resistance welding to produce a three-electrode laminate unit.

Next, two rectangular outer packaging films having a size that matched the obtained three-electrode laminate unit were prepared. One of these two outer packaging films was subjected to deep drawing to a depth of 6.5 mm. Then, the three-electrode laminate unit was arranged at a center part of the outer packaging film that was subjected to deep drawing and overlaid with the other outer packaging film. Said three-electrode laminate unit covered with the external packaging films was sealed at three sides of the external packaging films. Subsequently, an electrolyte solution was prepared by dissolving $LiPF_6$ to a concentration of 1 mol/L in a mixed solvent containing ethylene carbonate (EC), diethyl carbonate (DEC) and propylene carbonate (PC) in a volume ratio of 3:4:1 and the three-electrode laminate unit is impregnated into the electrolyte solution in a vacuum. Then the one unsealed side of the external packaging films was sealed to produce four film-type lithium capacitors 1.

It is noted that an amount of lithium metal arranged inside the obtained lithium ion capacitor corresponds to 400 mAh/g per mass of the negative electrode active material.

<<Initial Evaluation of Lithium Ion Capacitor>>

After the four lithium ion capacitors 1 were produced, they were allowed to stand for 20 days. One of these lithium ion capacitors 1 was then disassembled to confirm that the lithium foil in relation to the lithium electrode disappeared. On the basis of this finding, it is judged that an intended amount of lithium ions corresponding to the electrostatic capacity per unit mass of the negative electrodes of not lower than 1021 F/g was doped (preliminarily charged) to the negative electrodes 20 days after the production of the capacitor. It is noted that the cell voltage of the lithium ion capacitor 1 before disassembling was 3 V.

<<Measurement of Pore Volume and Specific Surface Area of Positive Electrode Layer in Positive Electrode Taken Out of Lithium Ion Capacitor>>

The positive electrode recovered from the lithium ion capacitor 1 disassembled as described above was cut into 5 $cm^3$, Immersed in a vessel containing 50 mL of dehydrated acetonitrile in a glove box substituted with argon and washed for 10 minutes at 25° C. while being stirred by a stirrer. This washing was repeated three times and the positive electrode was then subjected to a pre-drying treatment at 60° C. for 1 hour. The positive electrode layer was scraped off from the positive electrode obtained by the pre-drying treatment and dried for 2 hours under conditions of 200° C. and a pressure reduced to 5.5 Pa to obtain a powdery mixture of constituent components (specifically, the positive electrode active material, the binder, the conductive agent and the thickener as constituent components of the positive electrode slurry layer, and the conductive layer) of the positive electrode layer.

Subsequently, the thus obtained powdery mixture was measured by the above-mentioned methods for the volume of pores having a pore size of not lower than 1.0 nm and lower than 1.4 nm, the volume of pores having a pore size of not lower than 0.6 nm and lower than 1.0 nm, the BET specific surface area and the total pore volume. The results are shown in Table 1-2 below.

<<Measurement of Initial Capacity and Energy Density of Lithium Ion Capacitor at 25° C.>>

Each of the three lithium ion capacitors 1 was charged at a constant current of 1.5 A until the cell voltage (voltage of capacitor) reached 3.8 V. Next, constant current-constant voltage charging was performed at an applied constant voltage of 3.8 V for 1 hour, and then discharging was performed at a constant current of 150 mA until the cell voltage (voltage of capacitor) drop to 2.2 V. These operations were repeated under an atmosphere of 25° C. as one cycle. The capacity (initial capacity) and the energy density of the capacitors were measured at the 10th discharge cycle and an average value of the three lithium ion capacitors 1 was calculated. Further, in this case, a value obtained by dividing a difference in voltage between immediately before discharging and 100 msec after the initiation of discharging by the discharge current was evaluated as direct current internal resistance. The results are shown in Table 1-3 below.

It is noted that evaluation criteria are shown below.
[Initial Capacity]
 Higher than 155 mAh: A
 150 to 155 mAh: B
 Lower than 150 mAh: C
[Energy Density]
 Higher than 10.5 Wh/l: A
 Equal to 10.5 Wh/l: B
 Lower than 10.5 Wh/l: C
[Direct Current Internal Resistance]
 Lower than 11 mΩ: A
 11 to 12 mΩ: B
 Higher than 12 mΩ: C <<Measurement of Initial Capacity and Energy Density of Lithium Ion Capacitor at −30° C.>>

Each of the three lithium ion capacitors 1 was allowed to stand under an atmosphere of −30° C. for 3 hours. Next, the capacitors were charged at a constant current of 1.5 A until the cell voltage (voltage of capacitor) reached 3.8 V, and then constant current-constant voltage charging was performed at an applied constant voltage of 3.8 V for 1 hour. Next, discharging was performed at a constant current of 150 mA until the cell voltage (voltage of capacitor) drop to 2.2 V under an atmosphere of −30° C. These operations were repeated under an atmosphere of −30° C. as one cycle. The capacity (initial capacity) and the energy density of the capacitors were measured at the 10th discharge cycle and an average value of the three lithium ion capacitors 1 was calculated. Further, in this case, a value obtained by dividing a difference in voltage between immediately before discharging and 100 msec after the initiation of discharging by the discharge current was evaluated as direct current internal resistance. The results are shown in Table 1-3.

It is noted that evaluation criteria are shown below.
[Initial Capacity]
 Higher than 130 mAh: A
 125 to 130 mAh: B
 Lower than 125 mAh: C
[Energy Density]
 Not lower than 9.0 Wh/l: A
 8.5 to 9.0 Wh/l: B
 Lower than 8.5 Wh/l: C
[Direct Current Internal Resistance]
 Lower than 120 mΩ: A
 120 to 125 mΩ: B
 Higher than 125 mΩ: C <<Change Rate of Measurement Value at −30° C. with Respect to Measurement Value at 25° C.>>

Further, a change rate of a measurement value at −30° C. (hereinafter, referred to as a "measurement value at low temperature") with respect to a measurement value at 25° C. (hereinafter, referred to as a "measurement value at normal temperature") (hereinafter, also referred to simply as a "change rate") was calculated by the following formula. The results are shown in Table 1-3.

Change rate=|measurement value at normal temperature−measurement value at low temperature|/measurement value at normal temperature×100

Evaluation criteria for this change rate are shown below.
[Change Rate (Lowering Rate) of Initial Capacity]
 Lower than 15%: A
 15 to 20%: B
 Higher than 20%: C
[Change Rate (Lowering Rate) of Energy Density]
 Lower than 15%: A
 15 to 20%: B
 Higher than 20%: C
[Change Rate (Increase Rate) of Direct Current Internal Resistance]
 Lower than 1100%: A
 1100 to 1200%: B
 Higher than 1200%: C Example 2: Production Example of Lithium Ion Capacitor 2

Four lithium ion capacitors 2 were obtained in the same manner as in Example 1, except that the positive electrode test sample 2 was used instead of the positive electrode test sample 1 in the production of the electrode laminate.

Initial evaluation of lithium ion capacitor was conducted on the obtained lithium ion capacitors 2 using the same methods as in Example 1. It was judged that, 20 days after the production of the capacitor, an intended amount of lithium ions corresponding to the electrostatic capacity per unit mass of the negative electrodes of not lower than 1021 F/g was doped (preliminarily charged) to the negative electrodes. It is noted that the cell voltage of the lithium ion capacitor 2 before disassembling was 3.1 V, thus discharging was performed at a constant current of 150 mA until the cell voltage (voltage of capacitor) drop to 3V and then constant current-constant voltage charging was performed at an applied constant voltage of 3 V for 1 hour.

Further, the positive electrode was taken out of the lithium ion capacitor 2 and measured, with the same methods as in Example 1, for the volume of pores having a pore size of not lower than 1.0 nm and lower than 1.4 nm, the volume of pores having a pore size of not lower than 0.6 nm and lower than 1.0 nm, the BET specific surface area, the total pore volume, the initial capacity, the energy density and the direct current internal resistance, whereby the change rate of the measurement value at −30° C. with respect to the measurement value at 25° C. was calculated. The results are shown in Table 1-2 and Table 1-3.

Example 3: Production Example of Lithium Ion Capacitor 3

Four lithium ion capacitors 3 were obtained in the same manner as in Example 1, except that the positive electrode test sample 3 was used instead of the positive electrode test sample 1 in the production of the electrode laminate.

Initial evaluation of lithium ion capacitor was conducted on the obtained lithium ion capacitors 3 using the same methods as in Example 1. It was judged that, 20 days after the production of the capacitor, an intended amount of lithium ions corresponding to the electrostatic capacity per unit mass of the negative electrodes of not lower than 1021 F/g was doped (preliminarily charged) to the negative electrodes. It is noted that the cell voltage of the lithium ion capacitor 3 before disassembling was 3 V.

Further, the positive electrode was taken out of the lithium ion capacitor 3 and measured, with the same methods as in Example 1, for the volume of pores having a pore size of not lower than 1.0 nm and lower than 1.4 nm, the volume of pores having a pore size of not lower than 0.6 nm and lower than 1.0 nm, the BET specific surface area, the total pore volume, the initial capacity, the energy density and the direct current internal resistance, whereby the change rate of the measurement value at −30° C. with respect to the measurement value at 25° C. was calculated. The results are shown in Table 1-2 and Table 1-3.

Example 4: Production Example of Lithium Ion Capacitor 4

Four lithium ion capacitors 4 were obtained in the same manner as in Example 1, except that in the production of the lithium ion capacitors an electrolyte solution prepared by dissolving $LiPF_6$ to a concentration of 1 mol/l in a mixed solvent containing ethylene carbonate (EC) and diethyl carbonate (DEC) in a volume ratio of 1:5 was used instead of the electrolyte solution prepared by dissolving $LiPF_6$ to a concentration of 1 mol/L in the mixed solvent containing ethylene carbonate (EC), diethyl carbonate (DEC) and propylene carbonate (PC) in a volume ratio of 3:4:1.

Initial evaluation of lithium ion capacitor was conducted on the obtained lithium ion capacitors 4 using the same methods as in Example 1. It was judged that, 20 days after the production of the capacitor, an intended amount of lithium ions corresponding to the electrostatic capacity per unit mass of the negative electrodes of not lower than 1021 F/g was doped (preliminarily charged) to the negative electrodes. It is noted that the cell voltage of the lithium ion capacitor 4 before disassembling was 3 V.

Further, the positive electrode was taken out of the lithium ion capacitor 4 and measured, with the same methods as in Example 1, for the volume of pores having a pore size of not lower than 1.0 nm and lower than 1.4 nm, the volume of pores having a pore size of not lower than 0.6 nm and lower than 1.0 nm, the BET specific surface area, the total pore volume, the initial capacity, the energy density and the direct current internal resistance, whereby the change rate of the measurement value at −30° C. with respect to the measurement value at 25° C. was calculated. The results are shown in Table 1-2 and Table 1-3.

Comparative Example 1: Production Example of Comparative Lithium Ion Capacitor 1

Four comparative lithium ion capacitors 1 were obtained in the same manner as in Example 1, except that the positive electrode test sample 4 was used instead of the positive electrode test sample 1 in the production of the electrode laminate.

Initial evaluation of lithium ion capacitor was conducted on the obtained comparative lithium ion capacitors 1 using the same methods as in Example 1. It was judged that, 20 days after the production of the capacitor, an intended amount of lithium ions corresponding to the electrostatic capacity per unit mass of the negative electrodes of not lower than 1021 F/g was doped (preliminarily charged) to the negative electrodes. It is noted that the cell voltage of the comparative lithium ion capacitor 1 before disassembling was 3 V.

Further, the positive electrode was taken out of the comparative lithium ion capacitor 1 and measured, with the same methods as in Example 1, for the volume of pores having a pore size of not lower than 1.0 nm and lower than 1.4 nm, the volume of pores having a pore size of not lower than 0.6 nm and lower than 1.0 nm, the BET specific surface area, the total pore volume, the initial capacity, the energy density and the direct current internal resistance, whereby the change rate of the measurement value at −30° C. with respect to the measurement value at 25° C. was calculated. The results are shown in Table 1-2 and Table 1-3.

Comparative Example 2: Production Example of Comparative Lithium Ion Capacitor 2

Four comparative lithium ion capacitors 2 were obtained in the same manner as in Example 1, except that the positive electrode test sample 5 was used instead of the positive electrode test sample 1 in the production of the electrode laminate.

Initial evaluation of lithium ion capacitor was conducted on the obtained comparative lithium ion capacitors 2 using the same methods as in Example 1. It was judged that, 20 days after the production of the capacitor, an intended amount of lithium ions corresponding to the electrostatic capacity per unit mass of the negative electrodes of not lower than 1021 F/g was doped (preliminarily charged) to the negative electrodes. It is noted that the cell voltage of the comparative lithium ion capacitor 2 before disassembling was 3 V.

Further, the positive electrode was taken out of the comparative lithium ion capacitor 2 and measured, with the same methods as in Example 1, for the volume of pores having a pore size of not lower than 1.0 nm and lower than 1.4 nm, the volume of pores having a pore size of not lower than 0.6 nm and lower than 1.0 nm, the BET specific surface area, the total pore volume, the initial capacity, the energy density and the direct current internal resistance, whereby the change rate of the measurement value at −30° C. with respect to the measurement value at 25° C. was calculated. The results are shown in Table 1-2 and Table 1-3.

Comparative Example 3: Production Example of Comparative Lithium Ion Capacitor 3

Four comparative lithium ion capacitors 3 were obtained in the same manner as in Example 1, except that the positive electrode test sample 6 was used instead of the positive electrode test sample 1 in the production of the electrode laminate.

Initial evaluation of lithium ion capacitor was conducted on the obtained comparative lithium ion capacitors 3 using the same methods as in Example 1. It was judged that, 20 days after the production of the capacitor, an intended amount of lithium ions corresponding to the electrostatic capacity per unit mass of the negative electrodes of not lower than 1021 F/g was doped (preliminarily charged) to the negative electrodes. It is noted that the cell voltage of the comparative lithium ion capacitor 3 before disassembling was 3 V.

Further, the positive electrode was taken out of the comparative lithium ion capacitor 3 and measured, with the same methods as in Example 1, for the volume of pores having a pore size of not lower than 1.0 nm and lower than 1.4 nm, the volume of pores having a pore size of not lower than 0.6 nm and lower than 1.0 nm, the BET specific surface area, the total pore volume, the initial capacity, the energy density and the direct current internal resistance, whereby the change rate of the measurement value at −30° C. with respect to the measurement value at 25° C. was calculated. The results are shown in Table 1-2 and Table 1-3.

TABLE 1-1

| | Positive electrode layer (B) before incorporated into cell | | | | | |
|---|---|---|---|---|---|---|
| | | Pore volume [cc/g] | | | | |
| | Positive electrode test sample | Pore size of not lower than 0.6 nm and lower than 1.0 nm | Pore size of not lower than 1.0 nm and lower than 1.4 nm | Total pore volume | BET specific surface area [m$^2$/g] | Electrode density [g/cm$^3$] |
| Example 1 | 1 | 0.23 | 0.16 | 1.13 | 2090 | 0.44 |
| Example 2 | 2 | 0.20 | 0.14 | 0.99 | 1920 | 0.46 |
| Example 3 | 3 | 0.24 | 0.18 | 1.19 | 2130 | 0.43 |
| Example 4 | 1 | 0.23 | 0.16 | 1.13 | 2090 | 0.44 |
| Comparative Example 1 | 4 | 0.16 | 0.11 | 1.01 | 1650 | 0.50 |
| Comparative Example 2 | 5 | 0.30 | 0.20 | 1.59 | 2520 | 0.30 |
| Comparative Example 3 | 6 | 0.18 | 0.11 | 1.00 | 1810 | 0.44 |

TABLE 1-2

| | Positive electrode layer (A) taken out of cell | | | | Solvent composition of electrolyte solution (volume ratio) | | |
|---|---|---|---|---|---|---|---|
| | Pore volume [cc/g] | | | | | | |
| | Pore size of not lower than 0.6 nm and lower than 1.0 nm | Pore size of not lower than 1.0 nm and lower than 1.4 nm | Total pore volume | BET specific surface area [m$^2$/g] | EC | PC | DEC |
| Example 1 | 0.19 | 0.13 | 1.01 | 1650 | 3 | 1 | 4 |
| Example 2 | 0.17 | 0.12 | 0.88 | 1550 | 3 | 1 | 4 |
| Example 3 | 0.21 | 0.15 | 1.06 | 1740 | 3 | 1 | 4 |
| Example 4 | 0.19 | 0.13 | 1.01 | 1650 | 1 | 0 | 5 |
| Comparative Example 1 | 0.11 | 0.09 | 0.9 | 1300 | 3 | 1 | 4 |
| Comparative Example 2 | 0.27 | 0.17 | 1.41 | 2080 | 3 | 1 | 4 |
| Comparative Example 3 | 0.14 | 0.09 | 0.89 | 1430 | 3 | 1 | 4 |

TABLE 1-3

| | Initial capacity | | | Energy density | | | Direct current internal resistance | | |
|---|---|---|---|---|---|---|---|---|---|
| | Measurement value at normal temperature [mAh] | Measurement value at low temperature [mAh] | Change rate (lowering rate) [%] | Measurement value at normal temperature [Wh/l] | Measurement value at low temperature [Wh/l] | Change rate (lowering rate) [%] | Measurement value at normal temperature [mΩ] | Measurement value at low temperature [mΩ] | Change rate (increase rate) [%] |
| Example 1 | 162 | 145 | 10 | 10.9 | 9.7 | 11 | 10.1 | 108 | 969% |
| Example 2 | 158 | 137 | 13 | 10.8 | 9.4 | 13 | 10.3 | 113 | 997% |
| Example 3 | 166 | 149 | 10 | 11.0 | 9.9 | 10 | 10.2 | 100 | 880% |
| Example 4 | 158 | 139 | 12 | 10.7 | 9.3 | 13.1 | 10.5 | 112 | 967% |
| Comparative Example 1 | 154 | 122 | 21 | 10.6 | 8.4 | 20.8 | 10.0 | 129 | 1190% |
| Comparative Example 2 | 172 | 148 | 14 | 10.4 | 8.9 | 14.4 | 9.6 | 97 | 910% |
| Comparative Example 3 | 155 | 124 | 20 | 10.4 | 8.3 | 20.2 | 10.5 | 127 | 1110% |

As shown in Tables 1-1 to 1-3, it was confirmed that the lithium ion capacitors according to Examples 1 to 4 exhibited high cell capacity, high energy density and low direct current internal resistance at −30° C.

On the other hand, the lithium ion capacitor according to Comparative Example 1 included the positive electrode in which the volume of pores having a pore size of not lower than 1.0 nm and lower than 1.4 nm was small. Accordingly, it was confirmed that the capacity and the energy density decreased and the direct current internal resistance increased at −30° C., whereby the lowering rates of the capacity and the energy density as well as the increase rate of the direct current internal resistance at −30° C. with respect to 25° C. increased.

The lithium ion capacitor according to Comparative Example 2 included the positive electrode in which the volume of pores having a pore size of not lower than 1.0 nm and lower than 1.4 nm was not lower than 0.11 cc/g. However the total pore volume of the positive electrode was too large, and thus it was confirmed that the electrode density and the energy density decreased.

The lithium ion capacitor according to Comparative Example 3 included the positive electrode in which the volume of pores having a pore size of not lower than 1.0 nm and lower than 1.4 nm was small. Accordingly, it was confirmed that the capacity and the energy density decreased and the direct current internal resistance increased at −30° C., whereby the lowering rates of the capacity and the energy density as well as the increase rate of the direct current resistance at −30° C. with respect to 25° C. increased.

Further, the lithium ion capacitor according to Example 4 included the same positive electrode as in Example 1, however the solvent composition of the electrolyte solution was changed. As a result, the capacity and the energy density at −30° C. became lower than those in Example 1. It is considered that this is because the Stokes diameter of solvated lithium ions changed, thereby causing a slight deviation in an optimum size of the pores.

INDUSTRIAL APPLICABILITY

The present invention can be used for producing a lithium ion capacitor capable of suppressing an increase in the resistance at low temperatures and improving the initial discharge capacity and the energy density at low temperatures, thereby reducing a lowering rate of the charge and discharge capacity at −30° C. with respect to that at normal temperature.

The invention claimed is:

1. A positive electrode for a lithium ion capacitor, the positive electrode comprising:
a positive electrode layer (A) which, after a following pretreatment for measurement, has a volume of pores having a pore size of 1.0 nm to 1.4 nm and of 0.11 cc/g or more, the pore size being calculated by a Horvath-Kawazoe (HK) method, and has a total pore volume calculated by a Brunauer-Emmett-Teller (BET) method of 1.1 cc/g or less, wherein
in the pretreatment for measurement:
the positive electrode is taken out of a cell having a cell voltage of 3 V, cut out and then immersed in 10 cc (mL) of dehydrated acetonitrile per 1 $cm^3$ of the positive electrode at 25° C. for 10 minutes with stirring; this immersion is repeated three times and the positive electrode is subjected to a pre-drying treatment at 60° C. for 1 hour; and the positive electrode layer (A) is scraped off from the positive electrode obtained by the pre-drying treatment and dried for 2 hours under conditions of 200° C. and a pressure reduced to 5.5 Pa.

2. The positive electrode for a lithium ion capacitor according to claim 1, wherein the positive electrode layer (A) has a BET specific surface area calculated by the BET method of 1500 $m^2/g$ to 2000 $m^2/g$.

3. The positive electrode for a lithium ion capacitor according to claim 1, wherein the positive electrode layer (A) has a volume of pores, having a pore size calculated by the HK method of 0.6 nm to 1.0 nm, and of 0.23 cc/g or less.

4. A lithium ion capacitor, comprising:
the positive electrode according to claim 1; and
an electrolyte solution containing a cyclic carbonate and a chain carbonate.

5. The lithium ion capacitor according to claim 4, wherein the electrolyte solution contains the cyclic carbonate of 20 to 70 vol % and the chain carbonate of 30 to 80 vol % in terms of a volume ratio as a solvent.

6. A positive electrode for a lithium ion capacitor, the positive electrode comprising:
a positive electrode layer (B), wherein, in the positive electrode before being incorporated into a cell, the positive electrode layer (B), after a following pretreatment for measurement, has a volume of pores having a pore size of 1.0 nm to 1.4 nm and of 0.13 cc/g or more, the pore size being calculated by a Horvath-Kawazoe (HK) method, and has a total pore volume calculated by a Brunauer-Emmett-Teller (BET) method of 1.2 cc/g or less, wherein
in the pretreatment for measurement:
the positive electrode layer (B) is scraped off and dried for 2 hours under conditions of 200° C. and a pressure reduced to 5.5 Pa.

7. The positive electrode for a lithium ion capacitor according to claim 6, wherein the positive electrode layer (B) has a BET specific surface area calculated by the BET method within a range of 1900 to 2300 $m^2/g$.

8. The positive electrode for a lithium ion capacitor according to claim 6, wherein the positive electrode layer (B) has a volume of pores, having a pore size of 0.6 nm to 1.0 nm calculated by the HK method, and of 0.27 cc/g or less.

9. A lithium ion capacitor, comprising:
the positive electrode according to claim 6; and
an electrolyte solution containing a cyclic carbonate and a chain carbonate.

10. The lithium ion capacitor according to claim 9, wherein the electrolyte solution contains the cyclic carbonate of 20 to 70 vol % and the chain carbonate of 30 to 80 vol % in terms of a volume ratio as a solvent.

* * * * *